No. 845,149. PATENTED FEB. 26, 1907.
J. C. WANDS.
SHOCK ABSORBING DEVICE.
APPLICATION FILED SEPT. 17, 1906.

Witnesses  Inventor:
John C. Wands
by Bakewell & Cornwall
Atty's

UNITED STATES PATENT OFFICE.

JOHN C. WANDS, OF ST. LOUIS, MISSOURI.

SHOCK-ABSORBING DEVICE.

No. 845,149.  Specification of Letters Patent.  Patented Feb. 26, 1907.

Application filed September 17, 1906. Serial No. 334,964.

*To all whom it may concern:*

Be it known that I, JOHN C. WANDS, a citizen of the United States, residing at St. Louis, Missouri, have invented a certain new and useful Improvement in Shock-Absorbing Devices, of which the following is a full, clear, and exact description, such as will enable others skilled in the art to which it appertains to make and use the same, reference being had to the accompanying drawings, forming part of this specification, in which—

Figure 1:
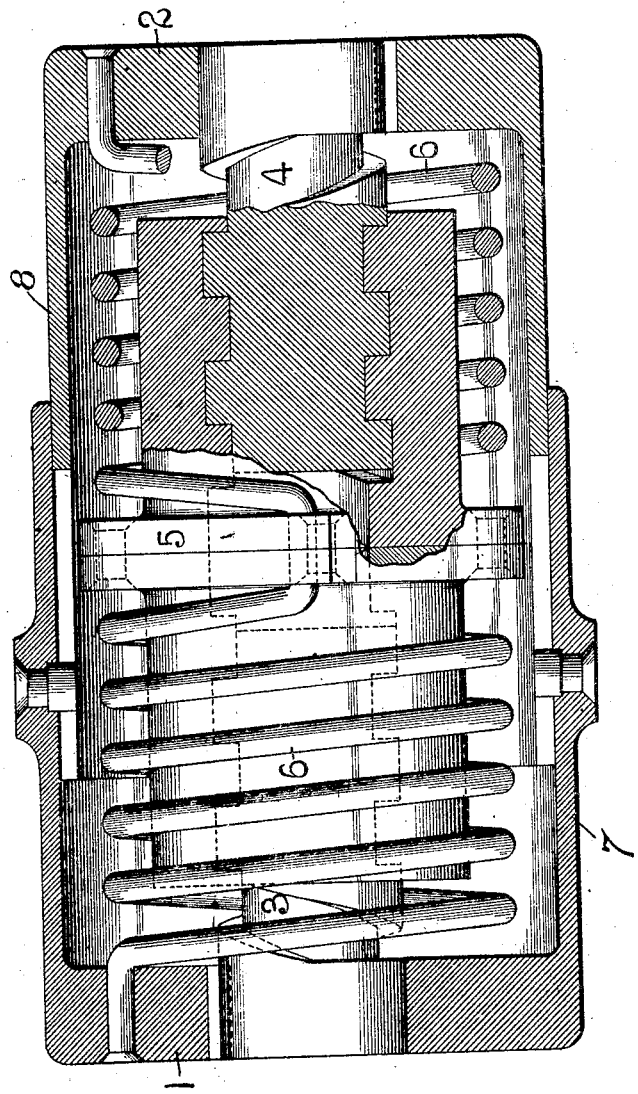
Figure 2:
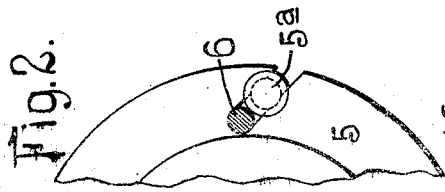

Figure 1 is a longitudinal view through my improved device, and Fig. 2 is a detail view showing the manner of mounting the spring.

This invention relates to a new and useful improvement in shock-absorbing devices for friction draft-gear, buffers, &c., the object being to so combine the parts having threaded connection with each other and a spring or springs that movement of one of the threaded parts will brace the spring or springs under tension or compression, as the case may be, which supplementing the friction-faces of the threads will absorb shocks or jars.

While I have mentioned in the above that the shock-absorbing device of my present application may be used for friction draft-rigging and in car-buffers, it is obvious that the device is also useful as a cushioning device for automobiles and wagons and as bolster-supports for car-trucks, &c.

In the accompanying drawings 1 and 2 indicate end pieces which may be designated as heads and which may be formed with lugs or ears to form seats for the yokes of car-couplers, if the device is used in friction draft-rigging, or said heads may have perforated ears or other fastening devices for engagement with a support and the part to be supported.

3 and 4 are threaded stems extending inwardly from the head-pieces and preferably in axial alinement with each other. The threads on stems 3 and 4 are pitched to the right and left, respectively. These threaded stems are shown in the drawings as being separately made from the head-pieces and keyed in position, which construction simplifies and reduces the cost of manufacture.

5 indicates a nut, which nut is preferably made in two parts whose contiguous ends are flanged and secured together, as shown. This nut has two female threads cut in it, one right and the other left, said threads engaging the correspondingly pitched threads of the threaded stems 3 and 4, extending inwardly from the head-pieces.

6 is a spring whose ends are connected to the head-pieces 1 and 2 and whose medial portion is provided with a reversing bend fitting in a slot in the centrally-arranged flange on the nut. In order to hold the spring in the slot, a rivet 5ª is arranged in the outer end of the slot for the purpose of holding the spring in place.

Instead of using a spring made of a single piece, as shown in the drawings, it is obvious that two oppositely-coiled springs could be used, which would be equivalent to cutting the reversing bend of the single spring shown in the drawings. By making the spring of a single piece of material the opposing coils can be formed by a single coiling operation, and the single piece of material possesses the further advantage of simplifying the connection between the ends of the spring of the opposing coils and the nut.

The heads 1 and 2 are provided with extensions 7 and 8, constituting a housing for the parts. Sections of this housing telescopically engage each other and preferably have slot-and-pin connection with each other for the purpose of maintaining alinement of the heads. This housing may be dispensed with, if desired, as its only value is to protect the moving parts and maintain the alinement of the heads in the event that the coils of the spring or springs on opposite sides of the nut are placed under unequal tension.

The right and left hand threaded connection between the stems and the double-pitched nut causes the nut to rotate when the heads are under load, and this rotation of the nut places the oppositely-wound springs under tension or compression, as the case may be. While I have shown torsion-springs and while I prefer to arrange these torsion-springs so that they will be wound up under load it is obvious that other forms of springs could be employed which would act in the same way as the torsion-springs shown and assist the friction of the inclined faces of the threads in offering resistance to the movement of the load upon the nut.

Having thus described the invention, what is claimed as new, and desired to be secured by Letters Patent, is—

1. In a shock-absorbing device, the combination with two head-pieces having threaded projections, the threads of said projections being oppositely pitched, a movable part having oppositely-pitched threads for engaging with said projections, and springs in which power is stored upon the movement of said movable part; substantially as described.

2. In a shock-absorbing device, the combination of two head-pieces, threaded projections extending inwardly from said head-pieces, the threads of said projections being oppositely pitched, a movable part having oppositely-pitched threads for engaging with said projections, springs connected to said head-pieces and said movable part, and a housing for inclosing said parts, said housing being composed of parts telescopically arranged with respect to each other; substantially as described.

3. In a shock-absorbing device, the combination of two head-pieces having inwardly-extending threaded projections, the threads of said projections being oppositely pitched, a movable part having oppositely-pitched threads for engagement with said projections, springs connected to said head-pieces and said movable part, said springs being coiled in opposite directions, and a housing inclosing said springs and movable part; substantially as described.

4. In a shock-absorbing device, the combination of two head-pieces, threaded projections extending inwardly from said head-pieces, the threads of said projections being oppositely pitched, a movable part having oppositely-pitched threads for engagement with said projections, and springs connected to said head-pieces and said movable part; substantially as described.

5. In a shock-absorbing device, the combination of two head-pieces having oppositely-pitched, inwardly-extending threaded posts, a nut having oppositely-pitched interior threads for engagement with said posts, and springs connected to said head-pieces and said nut; substantially as described.

6. In a shock-absorbing device, the combination of two head-pieces having inwardly-extending posts, said posts having right and left hand screw-threads respectively, a nut having right and left hand screw-threads for engagement with said posts, and oppositely-coiled springs connected to said head-pieces and said nut; substantially as described.

7. In a shock-absorbing device, the combination of two head-pieces having inwardly-extending posts, said posts having right and left hand screw-threads respectively, a nut having right and left hand screw-threads for engagement with said posts, and two springs formed of a single piece of material provided with a reverse bend, the ends of said piece being connected to said head-pieces and the reverse bend being connected to said nut; substantially as described.

In testimony whereof I hereunto affix my signature, in the presence of two witnesses, this 13th day of September, 1906.

JOHN C. WANDS.

Witnesses:
F. R. CORNWALL,
GEORGE BAKEWELL.